(12) United States Patent
Zhang et al.

(10) Patent No.: US 10,799,979 B2
(45) Date of Patent: Oct. 13, 2020

(54) SYSTEMS AND METHODS FOR DETERMINING EFFICIENCY OF FRICTION WELDING PROCESSES

(71) Applicants: Ohio State Innovation Foundation, Columbus, OH (US); Government of the United States as Represented by the Secretary of the Air Force, Wright-Patterson AFB, OH (US)

(72) Inventors: Wei Zhang, Dublin, OH (US); David Mahaffey, Wright-Patterson AFB, OH (US); Sheldon Semiatin, Wright-Patterson AFB, OH (US); Oleg Senkov, Dayton, OH (US); Daniel Tung, Newark, OH (US)

(73) Assignees: Ohio State Innovation Foundation, Columbus, OH (US); Government of the United States as Represented by the Secretary of the Air Force, Wright-Patterson AFB, OH (US)

( * ) Notice: Subject to any disclaimer, the term of this patent is extended or adjusted under 35 U.S.C. 154(b) by 423 days.

(21) Appl. No.: 15/824,251

(22) Filed: Nov. 28, 2017

(65) Prior Publication Data

US 2018/0147656 A1 May 31, 2018

Related U.S. Application Data

(60) Provisional application No. 62/426,772, filed on Nov. 28, 2016.

(51) Int. Cl.
*B23K 20/12* (2006.01)

(52) U.S. Cl.
CPC .................. *B23K 20/121* (2013.01)

(58) Field of Classification Search
CPC .................................................. B23K 20/121
See application file for complete search history.

(56) References Cited

U.S. PATENT DOCUMENTS

| 4,757,932 A | 7/1988 | Benn et al. |
| 6,138,896 A | 10/2000 | Ablett et al. |

(Continued)

OTHER PUBLICATIONS

D.W. Mahaffey; O.N. Senkov; R. Shivpuri; and S.L. Semiatin; "Effect of Process Variables on the Inertia Friction Welding of Superalloys LSHR and Mar-M247", Published Online Jun. 8, 2016; vol. 47A (Year: 2016).*

(Continued)

*Primary Examiner* — Manuel A Rivera Vargas
(74) *Attorney, Agent, or Firm* — Meunier Carlin & Curfman LLC (57) ABSTRACT

Systems and methods for calculating efficiency of a rotary friction welding process are described herein. An example method can include measuring kinetic energy transferred from a welding machine to an interface of a welded joint, and calculating an efficiency of a rotary friction welding process based on the measured kinetic energy. For example, a workpiece torque experienced by a sample can be measured, and an energy associated with the workpiece torque can be calculated. The efficiency of the rotary friction welding process can then be calculated using the energy associated with the workpiece torque.

21 Claims, 8 Drawing Sheets

(56) References Cited

U.S. PATENT DOCUMENTS

| | | | | |
|---|---|---|---|---|
| 2005/0218192 A1* | 10/2005 | Lovin | ............ | B23K 20/12 228/113 |
| 2006/0049235 A1 | 3/2006 | Lovin et al. | | |
| 2012/0012643 A1 | 1/2012 | Beech et al. | | |

OTHER PUBLICATIONS

D. W. Mahaffey; O. N. Senkov; R. Shivpuri & S. L. Semiatin; "Effect of Process Variables on the Inertia Friction Welding of Superalloys LSHR and Mar-M247", Published Jun. 8, 2016, Springer Link, Metallurgical and Materials Transactions A vol. 47, pp. 3981-4000(2016) (Year: 2016).*

Chamanfar, et al., "A Review on Inertia and Linear Friction Welding of Ni-Based Superalloys," Metallurgical and Materials Transactions A, vols. 46A, April, pp. 1639-1669, 2015.

Kessler, et al., "Modeling of upset and torsional moment during inertia frictionwelding.", Journal of Materials Processing Technology, vol. 227 (2016), pp. 34-40.

Maalekian, "Friction Welding—Critical Assessment of Literature," Science and Technology of Welding and Joining, vol. 12, No. 8, pp. 708-729, 2007.

Mohammed, et al., "The Evaluation of Coefficient of Friction for Representative and Predictive Finite Element Modelling of the Inertia Friction Welding," in Proceedings of ASME Turbo Expo, Orlando, FL, 2009, pp. 829-837.

Parida, et al., "Design and development of fixture and force measuring system for friction stir welding process using strain gauges", Journal of Mechanical Science and Technology, vol. 29 (2), (2015), pp. 739-749.

Trepte, et al., "Measurement of frictional torque in friction welding", Welding Int., vol. 5(11), (1991), pp. 914-915.

Tung, et al., "Modeling Heat Generation in Inertia Friction Welding," Materials Science and Technology (MS&T) Conference 2014.

Turner, et al., "Calculating the energy required to undergo the conditioning phase of a titanium alloy inertia friction weld", Journal of Manufacturing Processes, vol. 24 (2016), pp. 186-194.

Vukcevic, et al., "Measurement in Friction Stir Welding Process", 15th International Research/Expert Conference "Trends in the Development of Machinery and Associated Technology" TMT 2011, Prague, Czech Republic, Sep. 12-18, 2011.

Wang, et al., "Energy-Input-Based Finite-Element Process Modeling of Inertia Welding," Metallurgical and Materials Transactions B, vol. 36B, pp. 513-523, 2005.

Yang, "Modelling of the Inertia Welding of Inconel 718," University of Birmingham PhD Thesis, 2010.

\* cited by examiner

SYSTEMS AND METHODS FOR DETERMINING EFFICIENCY OF FRICTION WELDING PROCESSES

CROSS-REFERENCE TO RELATED APPLICATIONS

This application claims the benefit of U.S. Provisional Patent Application No. 62/426,772, filed on Nov. 28, 2016, entitled "SYSTEMS AND METHODS FOR DETERMINING EFFICIENCY OF FRICTION WELDING PROCESSES," the disclosure of which is expressly incorporated herein by reference in its entirety.

STATEMENT REGARDING FEDERALLY FUNDED RESEARCH

This invention was made with government support under Grant no. IIP1034729 awarded by the National Science Foundation and Grant nos. FA8650-10-D-5226 and FA8650-15-D-5230 awarded by the Department of the Air Force. The government has certain rights in the invention.

BACKGROUND

Friction welding is a category of solid-state welding processes that use frictional heat generation at the weld interface to plasticize the workpieces and produce a metallurgical bond. Rotary friction welding processes include, but are not limited to, inertia friction welding, continuous drive friction welding, hybrid friction welding (i.e., a combination of inertia and continuous drive friction welding), or orbital friction welding. It should be understood that continuous drive friction welding is sometimes referred to as direct drive friction welding. Rotary friction welding is extremely useful for axi-symmetric components such as axles, pistons, and turbine engine components. Difficult to weld materials such as nickel-base superalloys are readily weldable with friction welding processes.

Welding parameters used in large-scale industrial production are typically determined via trial and error. For example, during this process, sub-scale coupons are welded with a variety of parameters. After each development weld, destructive quality inspection is performed and welding parameters are adjusted accordingly. This optimization process is time consuming and costly due to labor, consumption of high-value materials, and energy usage. Moreover, welding parameters oftentimes do not translate well from small-scale coupons to large-scale production.

A technology that allows manufacturers to determine welding energy efficiency in real-time and control the appropriate welding parameters during production could save substantial time and cost for large-scale industrial production. Further reduction in development welding could be achieved through computer-aided engineering (CAE) simulation such as process modeling based on finite element method (FEM), for which efficiency is a critical input parameter.

SUMMARY

An example method for calculating efficiency of a rotary friction welding process is described herein. The method can include measuring kinetic energy transferred from a welding machine to an interface of a welded joint, and calculating an efficiency of a rotary friction welding process based on the measured kinetic energy.

Additionally, measuring the kinetic energy transferred from the welding machine to the interface of the welded joint can include measuring a workpiece torque experienced by a sample, and calculating an energy associated with the workpiece torque. The efficiency of the rotary friction welding process can be calculated using the energy associated with the workpiece torque. In some implementations, a strain gauge attached to the sample can be used to measure the workpiece torque experienced by the sample.

Alternatively or additionally, the energy associated with the workpiece torque can be an instantaneous energy or a cumulative energy over a period of time.

Alternatively or additionally, the method can include obtaining a total energy supplied to the welding machine to spin the sample. The efficiency of the rotary friction welding process can be calculated using the energy associated with the workpiece torque and the total energy, for example, as a ratio between the energy associated with the workpiece torque and the total energy.

Alternatively or additionally, the method can include measuring a rotational velocity of the welding machine, calculating a total torque required to cause a decrease in the rotational velocity of the welding machine, and calculating an energy associated with the total torque. The efficiency of the rotary friction welding process can be calculated using the energy associated with the workpiece torque and the energy associated with the total torque, for example, as a ratio between the energy associated with the workpiece torque and the energy associated with the total torque.

Alternatively or additionally, the energy associated with the total torque is an instantaneous energy or a cumulative energy over a period of time.

Alternatively or additionally, the method can include using the efficiency of the rotary friction welding process to control the rotary friction welding process.

Alternatively or additionally, the method can include using the efficiency of the rotary friction welding process in a computational thermal or thermal-stress model used to determine a parameter for the rotary friction welding process. Optionally, the parameter can include at least one of axial load, moment of inertia of a flywheel for an inertia friction welding machine, initial rotational velocity or kinetic energy of the flywheel for the inertia friction welding machine, rotational speed of a direct drive welding machine, sample surface roughness, sample diameter, pre-heating temperature, welding time, burnoff length, or interface temperature.

An example system for calculating efficiency of a rotary friction welding process is described herein. The system can include a torque load cell configured to measure a workpiece torque experienced by a sample, and a processor and a memory operably coupled to the processor. The processor can be configured to receive the workpiece torque experienced by the sample, calculate an energy associated with the workpiece torque, and calculate an efficiency of a rotary friction welding process using the energy associated with the workpiece torque. Optionally, the torque load cell can be attached to the sample. Alternatively or additionally, the sample is a rotating or non-rotating sample.

Alternatively or additionally, the energy associated with the workpiece torque can be an instantaneous energy or a cumulative energy over a period of time.

Alternatively or additionally, the processor can be configured to receive a total energy supplied to the welding machine to spin the sample. The efficiency of the rotary friction welding process can be calculated using the energy associated with the workpiece torque and the total energy, for example, as a ratio between the energy associated with the workpiece torque and the total energy.

Alternatively or additionally, the processor can be configured to measure a rotational velocity of the welding machine, calculate a total torque required to cause a decrease in the rotational velocity of the welding machine, and calculate an energy associated with the total torque. The efficiency of the rotary friction welding process can be calculated using the energy associated with the workpiece torque and the energy associated with the total torque, for example, as a ratio between the energy associated with the workpiece torque and the energy associated with the total torque.

Alternatively or additionally, the energy associated with the total torque is an instantaneous energy or a cumulative energy over a period of time.

It should be understood that the above-described subject matter may be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for determining efficiency of an inertia friction welding process, it will become evident to those skilled in the art that the implementations are not limited thereto, but are applicable to determining efficiency of other rotary friction welding processes such as a continuous (or direct) drive friction welding process. As used herein, the terms "sample" and "workpiece" are used interchangeably when referencing the parts being joining during the rotatory friction welding.

Friction welding processes are an important group of joining processes used for the manufacturing of structural components such as land- and air-based turbine engines. Machine (or welding) energy efficiency is an important parameter that is largely unknown in conventional applications. Accurate efficiency values can potentially save manufacturers millions of dollars by their use in numerical simulation such as process modeling based on finite element method to reduce trial-and-error experimentation, scale-up issues from process parameter development coupons to production of large structures, improved quality control and process monitoring, energy costs, and/or environmental impact. The systems and methods described herein provide a low-cost technique for determining machine or welding process efficiency in-situ during welding. The systems can be readily used with inertia or direct drive friction welding equipment. The efficiency determined according to the techniques described herein not only enables real-time feedback for improving control of the welding equipment but also provides essential input to process optimization using finite element or other CAE models.

As noted above, the systems and methods described herein can be used for a variety of rotary friction welding processes including, but not limited to, inertia friction welding (IFW), direct drive (or continuous drive) friction welding, hybrid friction welding (i.e., a combination of inertia and direct drive), and orbital friction welding. These welding processes are common in the aerospace, agricultural, automotive, defense, marine, electrical, and oil industries, including use in joining turbine engine components, suspension components, valves, drive systems, gears, hydraulic piston rods, and axles. See Welding Handbook Volume 2: Welding Processes, Eighth Edition, *American Welding Society*, 1991. Use of IFW in an aerospace industry application is described as an example herein. It should be understood, however, that the systems and methods described herein are applicable to other rotary friction welding processes and other industry applications.

IFW is a solid-state joining process capable of consistently producing high quality bonds between cylindrical parts. Consistency and quality are critical in, for example, the turbine engine industry due to the cost of materials and the catastrophic consequences of engine failure. IFW has become de facto the most important welding process for fabrication of aerospace engine structures as many high temperature alloys—especially i-precipitate-strengthened nickel base superalloys—have a plethora of fusion weldability issues.

The aerospace industry is facing an ever-demanding requirement for greenhouse gas emission reductions. To continue improving fuel efficiency, advanced nickel base superalloys, titanium alloys, and intermetallics are increasingly deployed for engine structures. Considering the costs of material and manufacturing, parts made of these advanced materials may approach $100/lb, which is two orders of magnitude more expensive than steels. Additionally, there exists a very narrow process window for successfully joining of these advanced materials due to their strength at elevated temperatures. Thus, it may require extensive experimental trials to find this narrow process parameter window with these advanced materials. Moreover, a several-month lead time is typically required for manufacturing. The cost of developing robust welding parameters for sound joining can easily exceed several millions of dollars, and such development effort may have to be redone when a new part and/or a new material is introduced. As a result, successful welding of engine structures using the fewest experimental trials and/or reduced energy usage has a high economic impact on the new engine development.

Currently, the development of IFW parameters is often largely based on experimental trials using small coupons and/or process modeling. The parameters are then scaled up for welding large structures. A major technical issue with the current process development approach is that the welding of coupons is often done in a different IFW machine than the IFW machine used for the production of actual structures. It should be understood that welding efficiency is defined as the ratio of the energy used to heat and plastically deform the joined components at the weld interface to the total energy expended during processing. For an IFW process, welding efficiency, defined as the fraction of the total energy stored in the flywheel of the welding machine which is transferred to the joint interface (i.e., as opposed to that lost in the machine), can vary from machine-to-machine. If such variation is sufficiently large, the parameters developed on the coupons welded with one IFW machine may not scale up correctly to those needed for welding the large structures with another IFW machine. Moreover, finite element modeling has been used to aid the process development, and the efficiency is an input parameter for finite element modeling and knowing its value and its dependence on the process parameters is critical to model accuracy.

Research and development efforts surrounding IFW are not reported to consider variations in efficiency with process parameters and/or type of welding machine. Sparse reports of efficiency in literature list values described to be industry accepted (See L. Yang, "Modelling of the Inertia Welding of Inconel 718," University of Birmingham PhD Thesis, 2010), or calculated values with neither explanation (See L. Wang, M. Preuss, P. Withers, G. Baxter, P. Wilson, "Energy-Input-Based Finite-Element Process Modeling of Inertia Welding," *Metallurgical and Materials Transactions B*, vol. 36B, pp. 513-523, 2005) nor experimental validation (See M. Mohammed, T. Hyde, C. Bennett, E. Williams, "Evaluation Coefficient Friction Representative Predictive Finite Element Inertia Friction Welding," *Proceedings of ASME Turbo Expo 2009: Power for Land, Sea, and Air*, vol. GT2009, pp. 829-837, 2009). Previous analytical and numerical modeling work has shown assumed efficiency values are an overestimation of real scenarios for many cases, and require further investigation. See D. J. Tung, W. Zhang, D. Mahaffey, O. Senkov, "Modeling Heat Generation in Inertia Friction Welding," Materials Science and Technology (MS&T) Conference 2014.

Figure 1:
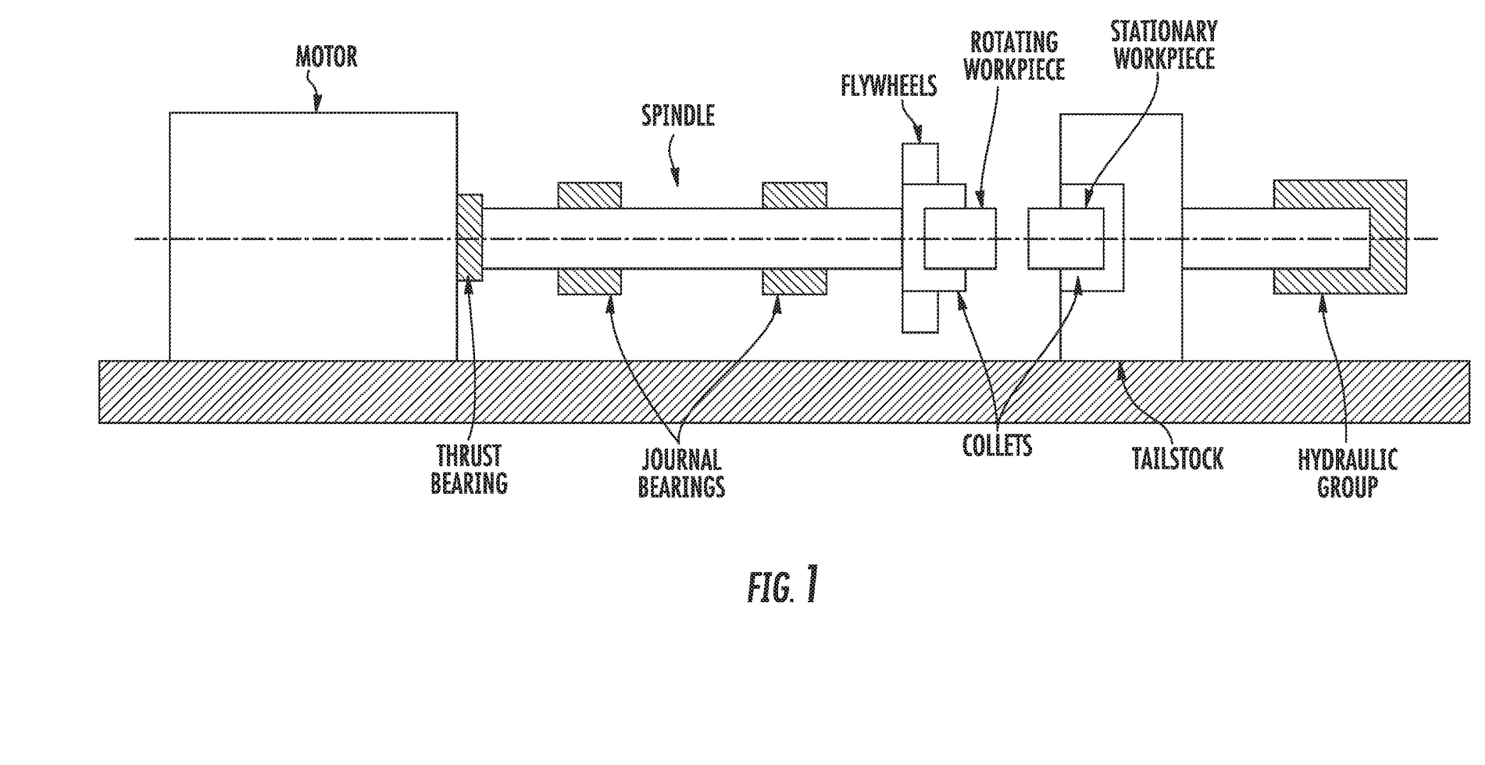
FIG. 1 is a block diagram illustrating an example IFW machine.

Referring now to FIG. 1, a block diagram of an example IFW machine is shown. As described above, welding efficiency (e.g., the fraction of energy transferred from the flywheel of the IFW machine to the joint interface) can vary from machine-to-machine. Efficiency is effected by, among other factors, machine bearings, which are not 100% efficient (i.e., no frictionless sliding). Additionally, the energy lost depends on a number of factors including, but not limited to, welding parameters, machine usage, etc. In some cases, welding parameters may need to be adjusted to account for changes in use (e.g., different parameters based on a light or heavy usage). A spinning flywheel will not spin indefinitely; energy will be lost to machine bearings over time. The machine uses two types of hydraulic bearings which impact machine efficiency: journal fluid bearings restrict radial displacement of the flywheel and spindle during rotation while thrust fluid bearings restrict axial displacement of the flywheel and spindle when axial load is applied. There are no bearings in the tailstock since the nonrotating workpiece remains stationary in all but the axial direction. Any energy not lost to the bearings in the machine is contributed to heating and deforming the mating workpiece interface, and vice versa. The systems and methods described herein can be used to measure, in-situ during the welding process, the kinetic energy transferred from the welding machine (e.g., from the flywheel of the IFW machine) to the joint interface, where heating and deformation occur. Using this measurement, the systems and methods described herein can calculate machine efficiency by calculating the fraction of initial kinetic energy which contributes to heating and deforming the mating workpiece interface and that which is lost to bearings. This measurement accounts for any events occurring between the rotating spindle and the non-rotating tailstock. Rotary welding machines, including IFW machines, are well known in the art and are therefore not described in further detail herein.

Figure 2:
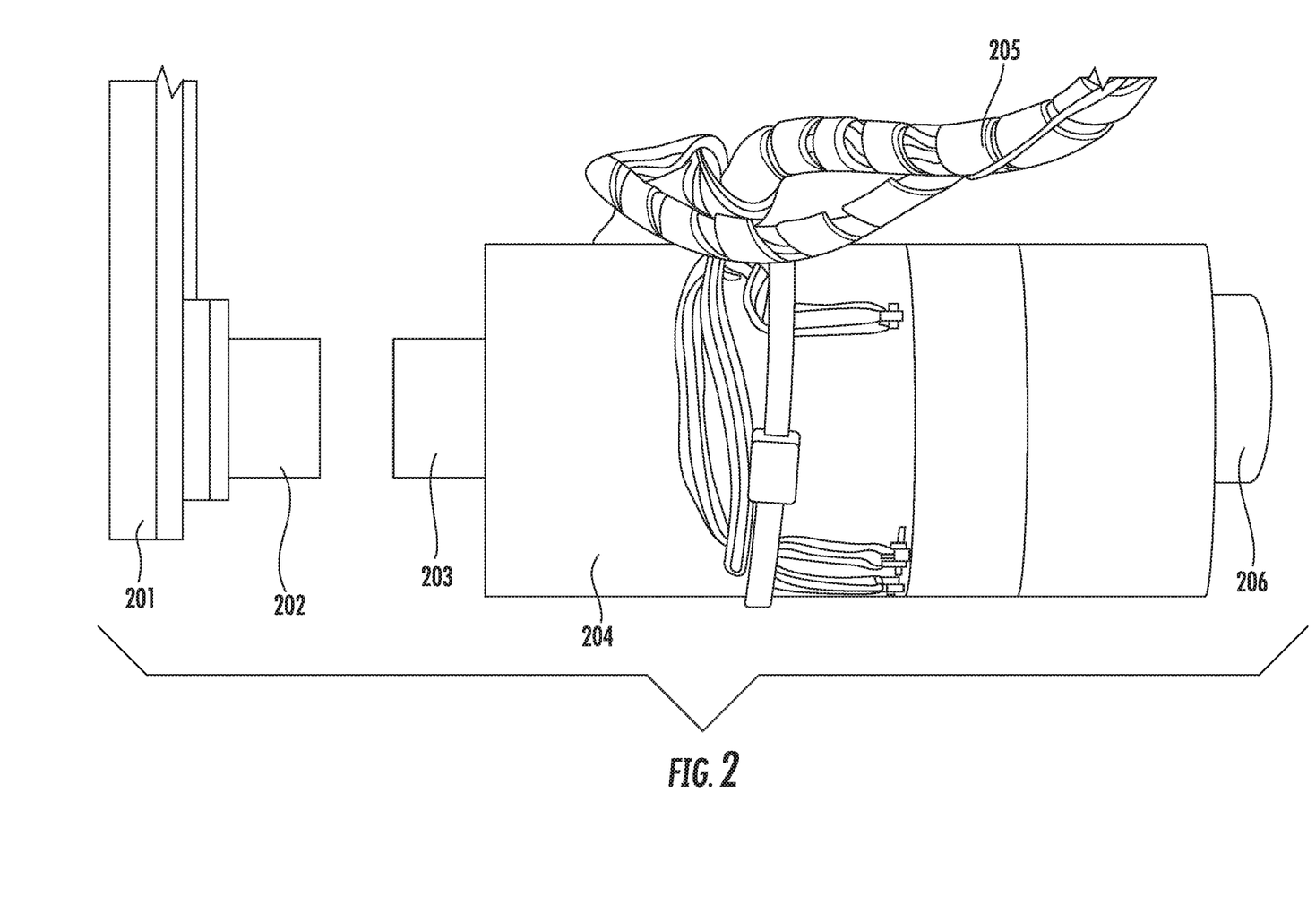
FIG. 2 is another diagram illustrating a portion of an example IFW machine including a torque load cell according to implementations described herein.

Referring now to FIG. 2, another diagram illustrating a portion of an example IFW machine including a torque load cell is shown. In FIG. 2, the IFW machine includes rotating flywheel 201, rotating sample 202, non-rotating sample 203, torque load cell 204 (sometimes referred to herein as "load cell"), and non-rotating tailstock 206. As described above, the rotating sample 202 and/or the non-rotating sample 203 can also be referred to as a workpiece, e.g., rotating workpiece or non-rotating workpiece. The load cell 204 can be configured to measure the workpiece torque experienced by a sample (e.g., rotating sample 202 or non-rotating sample 203). In FIG. 2, the load cell 204 is attached to the non-rotating sample 203 and is configured to measure the workpiece torque of the non-rotating sample 203. In other implementations, this disclosure contemplates that a load cell can be configured to measure the workpiece torque of the rotating sample 202.

Figure 3:
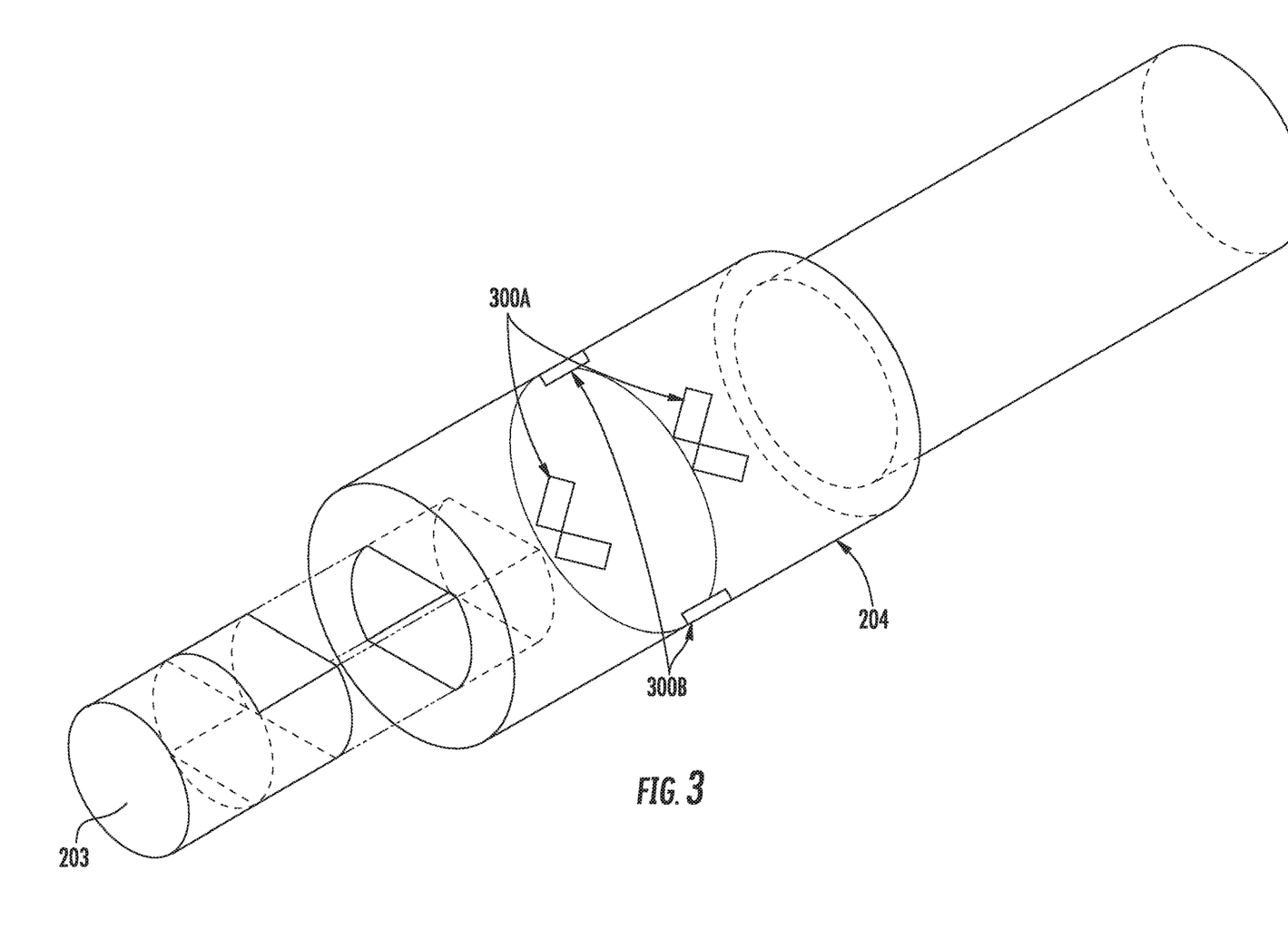
FIG. 3 is a schematic diagram illustrating location of strain gages on an example torque load cell.
Figure 4:
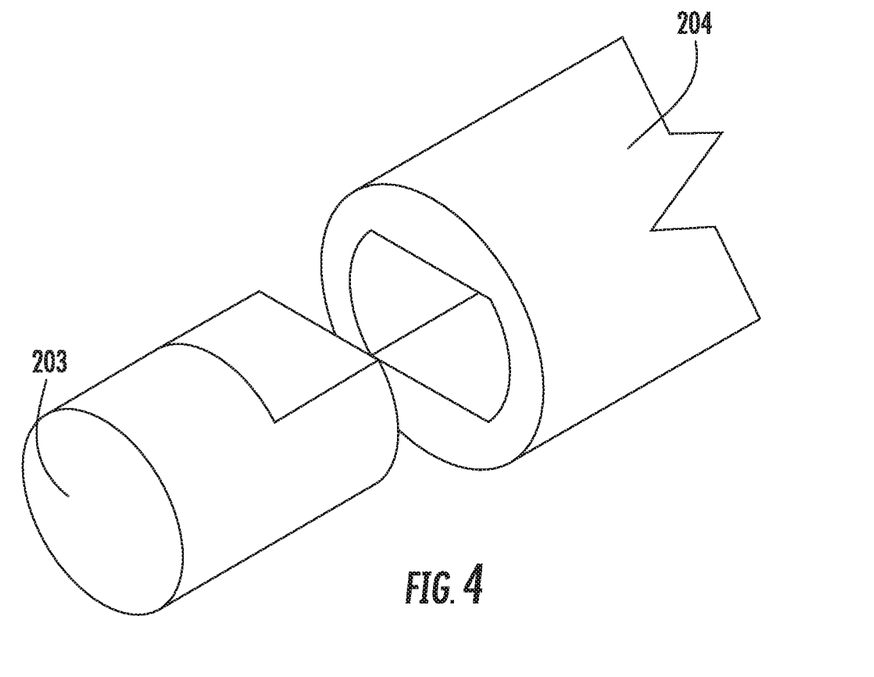
FIG. 4 is a schematic diagram illustrating the sample-load cell interface.

Referring now to FIG. 3, a schematic diagram illustrating location of strain gages on an example torque load cell is shown. As shown in FIG. 3, the torque load cell 204 includes a plurality of strain gauges 300A, 300B (collectively referred to herein as "strain gauges 300") (e.g., six in FIG. 3). The strain gauges 300 can include torsional strain gauges 300A. Optionally, the strain gauges can include axial strain gauges 300B. In FIG. 3, four of the six strain gauges (i.e., torsional strain gauges 300A) are configured in a full Wheatstone bridge and are used to measure the workpiece torque, and the remaining two strain gauges (i.e., axial strain gauges 300B) are configured in a half-bridge and are optionally used to measure the axial load. This disclosure contemplates that the strain gauges 300 can be coupled to a signal amplification system and/or measurements from the strain gauges 300 can be calibrated to obtain torque measurements. Additionally, the measurements collected by one or more of the strain gauges 300 can be used to calculate the workpiece torque experienced by the non-rotating sample 203 according to techniques known in the art. It should be understood that the number (e.g., four torsional and two axial strain gauges) and/or arrangement (e.g., Wheatstone bridge configuration) of strain gauges in FIG. 3 is provided only as an example and that other numbers and/or arrangements of strain gauges can be used to measure the workpiece torque experienced by a sample. Referring now to FIG. 4, a schematic diagram illustrating the sample-load cell interface is shown. The torque load cell 204 is attached to a non-rotating sample 203 by placing the non-rotating sample 203 into an end of the load cell 204 as shown in FIG. 4. The stickout distance of the non-rotating sample 203 from the non-rotating tailstock can be minimized to ensure that the non-rotating sample 203 remains on axis during the welding process. It should be understood that the torque load cell shown in FIGS. 3 and 4 is only one example load cell that can be used with the systems and methods described herein. This disclosure contemplates that other torque load cells can be used to measure workpiece torque. For example, strain gauges can be directly mounted on welded parts, a torque arm or torsional strain gauges can be installed on the non-rotating tailstock, and/or other torque measurement devices can be used.

Referring again to FIG. 2, the torque load cell 204 can be coupled with a computing device (e.g., the computing device 500 of FIG. 5) through one or more communication links 205. This disclosure contemplates the communication links 205 are any suitable communication link. For example, a communication link may be implemented by any medium that facilitates data exchange between the load cell 204 and the computing device including, but not limited to, wired, wireless and optical links. Example communication links include, but are not limited to, a LAN, a WAN, a MAN, Ethernet, the Internet, or any other wired or wireless link such as WiFi, WiMax, 3G or 4G.

It should be appreciated that the logical operations described herein with respect to the various figures may be implemented (1) as a sequence of computer implemented acts or program modules (i.e., software) running on a computing device (e.g., the computing device described in FIG. 5), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 5:
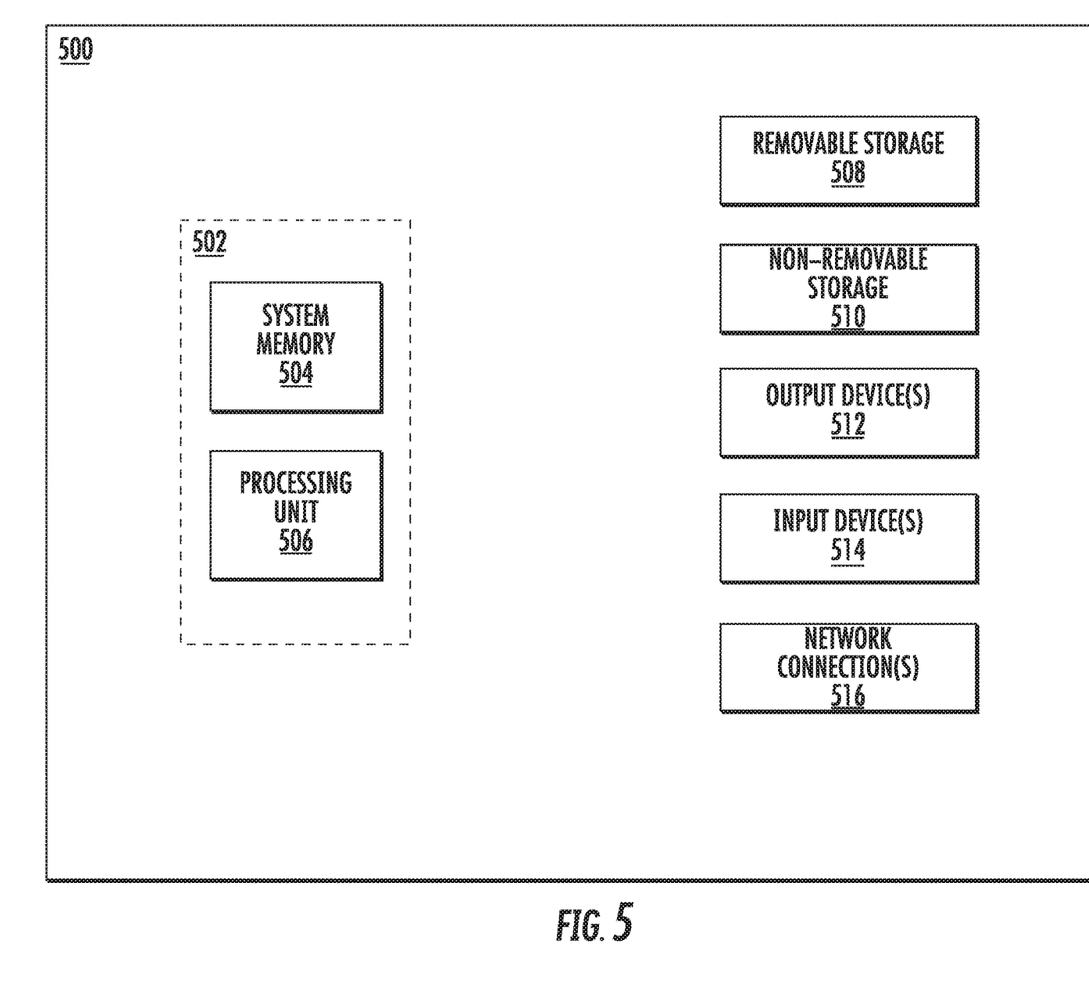
FIG. 5 is a block diagram of an example computing device.

Referring to FIG. 5, an example computing device 500 upon which embodiments of the invention may be implemented is illustrated. It should be understood that the example computing device 500 is only one example of a suitable computing environment upon which embodiments of the invention may be implemented. Optionally, the computing device 500 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for operation of the computing device 500. The computing device 500 may also include a bus or other communication mechanism for communicating information among various components of the computing device 500.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Either the network connection(s) 516 or the input device(s) 514 may be connected to a communication link(s) to a load cell configured to measure workpiece torque (e.g., communication links 205 in FIG. 2). Output device(s) 512 such as a display, speakers, printer, etc. may also be included. The additional devices may be connected to the bus in order to facilitate communication of data among the components of the computing device 500. All these devices are well known in the art and need not be discussed at length here.

The processing unit 506 may be configured to execute program code encoded in tangible, computer-readable media. Tangible, computer-readable media refers to any media that is capable of providing data that causes the computing device 500 (i.e., a machine) to operate in a particular fashion. Various computer-readable media may be utilized to provide instructions to the processing unit 506 for execution. Example tangible, computer-readable media may include, but is not limited to, volatile media, non-volatile media, removable media and non-removable media implemented in any method or technology for storage of information such as computer readable instructions, data structures, program modules or other data. System memory 504, removable storage 508, and non-removable storage 510 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Methods for calculating efficiency of a rotary friction welding process are described below. This disclosure contemplates that the methods can be implemented using a torque load cell (e.g., load cell 204 of FIG. 2) and computing device (e.g., computing device 500 of FIG. 5). As described above, the torque load cell can be configured for use with a welding machine such as an IFW machine or other rotary welding machine, for example. The load cell can be configured to measure workpiece torque of a sample (e.g., rotating sample 202 or non-rotating sample 203 of FIG. 2) as described above, and the workpiece torque can be transmitted to the computing device for processing as described below. The methods include measuring the total energy used during welding and the fraction transferred to heat and plastically deform the weld samples at the interface region, and then calculating the efficiency of a rotary friction welding process based on the measured energies. For example, the load cell can be used to measure workpiece torque experienced by a sample. The workpiece torque can be used to calculate the energy associated with the workpiece torque (e.g., $E_{Workpiece}$) for heating and plastic deformation of the workpieces, for example, using Eqn. (3) below for instantaneous energy or Eqn. (4) below for cumulative energy. The energy associated with the workpiece torque can be compared to the total energy to obtain the efficiency of the rotary friction welding process. For example, the efficiency can be a ratio of the energy associated with the workpiece torque to the total energy.

Figure 6:
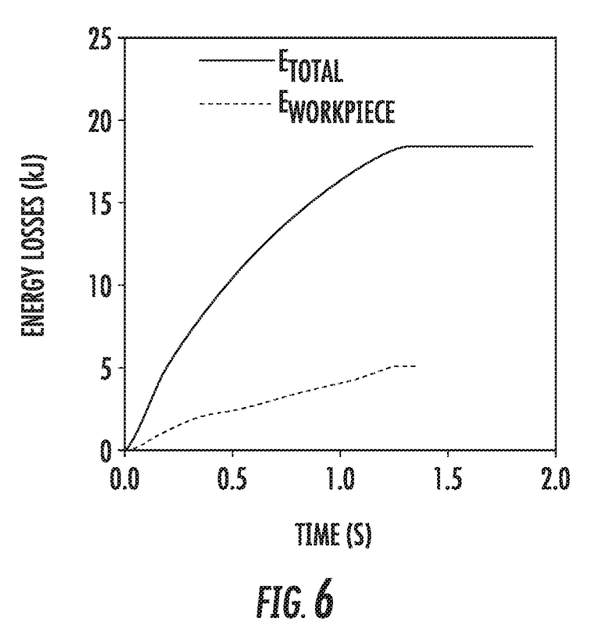
FIG. 6 is a graph illustrating the total energy consumed during a welding process ($E_{Total}$) and the net energy contributing to welding ($E_{Workpiece}$) over time.
Figure 7:
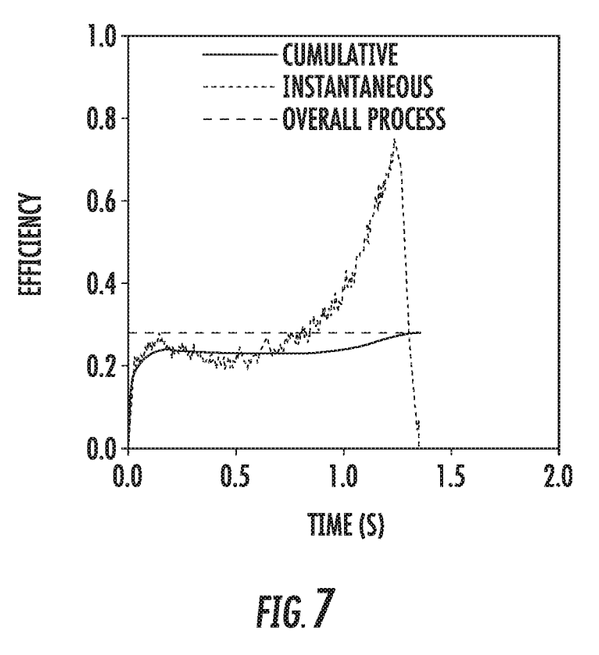
FIG. 7 is a graph illustrating the calculated instantaneous and cumulative efficiencies representing the ratio of energy contributing to welding ($E_{Workpiece}$) to total energy consumed during a welding process ($E_{Total}$) over time.

In some implementations, the total energy can be a total energy supplied to the welding machine to spin the sample. The total energy used can optionally be obtained from the welding machine based on power consumption. This can be useful in continuous drive welding applications or IFW applications. In other implementations, the total energy can be an energy associated with total torque required to cause a decrease in rotational velocity of the welding machine. This can be useful in IFW applications. The rotational velocity of the welding machine (e.g., rotational velocity of the flywheel) can be measured, and the total torque required to cause the decrease in rotational velocity of the welding machine can be calculated, e.g., using Eqn. (1) below. Then, the energy associated with the total torque (e.g., $E_{Total}$) can be calculated, e.g., using Eqn. (2) for cumulative energy. To calculate efficiency, the energy associated with the workpiece torque (e.g., $E_{Workpiece}$) can be compared to the energy associated with the total torque (e.g., $E_{Total}$), e.g., using Eqn. (5a) below for instantaneous efficiency or Eqn. (5b) below for cumulative efficiency. It should be understood that the instantaneous energy/efficiency is the energy/efficiency at a given time (e.g., at a moment in time), and the cumulative energy/efficiency is the energy/efficiency integrated over a period of time. FIG. 6 is a graph illustrating the energy used for welding the samples (i.e., energy associated with the workpiece torque, $E_{Workpiece}$) and the total energy (i.e., energy associated with the total torque, $E_{Total}$), calculated as a function of welding time, in one example using the techniques described herein. Efficiency can then be calculated as the ratio of energy used for welding the samples to the total energy consumed. FIG. 7 is a graph illustrating the calculated instantaneous and cumulative efficiencies as a function of welding time. The final value on the cumulative efficiency curve represents the overall process efficiency, which is shown by the dashed line in FIG. 7. The efficiency calculation in this example aligns well with other studies. Literature-reported efficiency values average 90% while analytical and numerical modeling predict efficiency values closer to 50% in some cases.[4]

Figure 8:
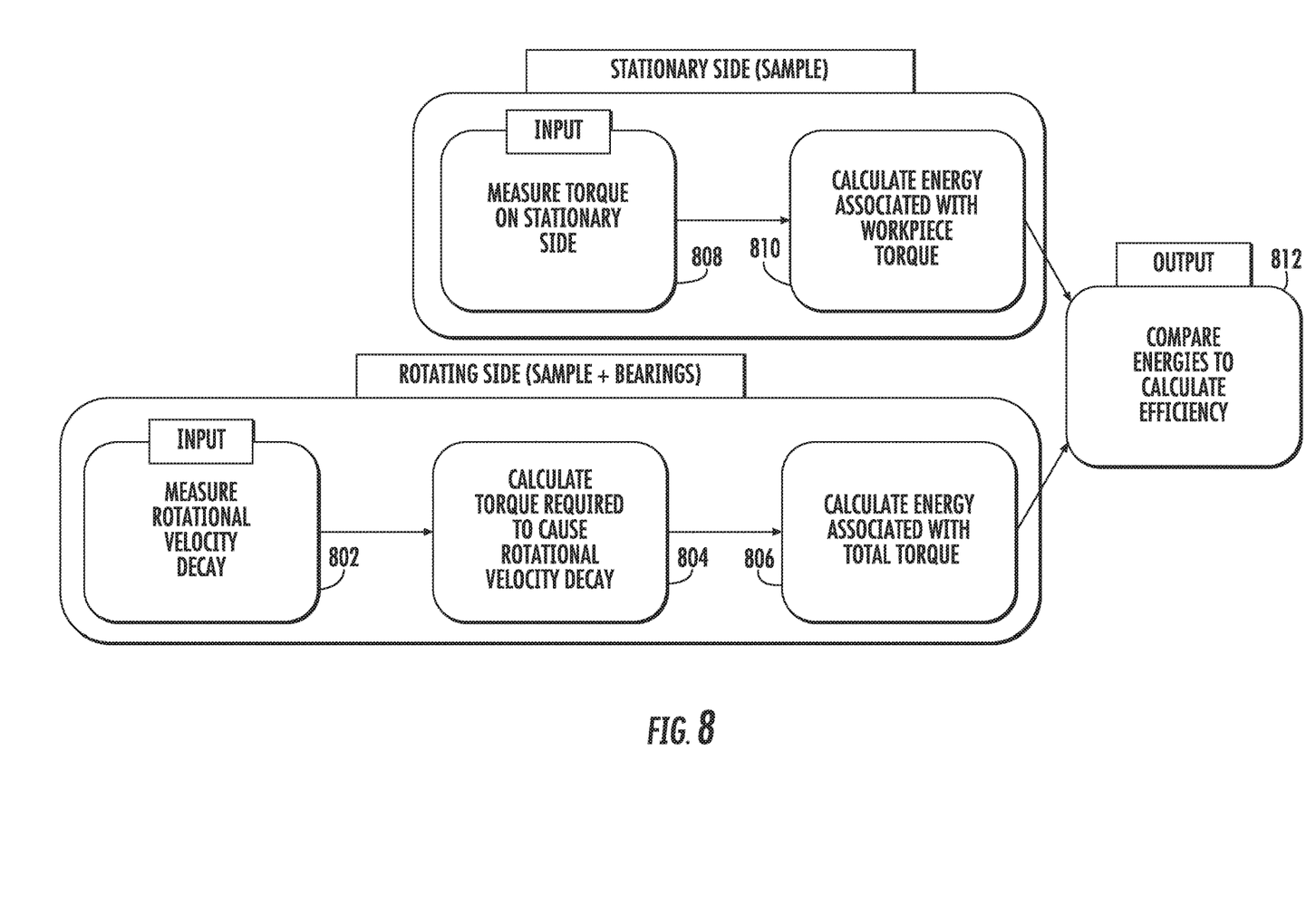
FIG. 8 is a flow diagram illustrating example operations for calculating efficiency of a rotary friction welding process according to implementations described herein.
Figure 9:
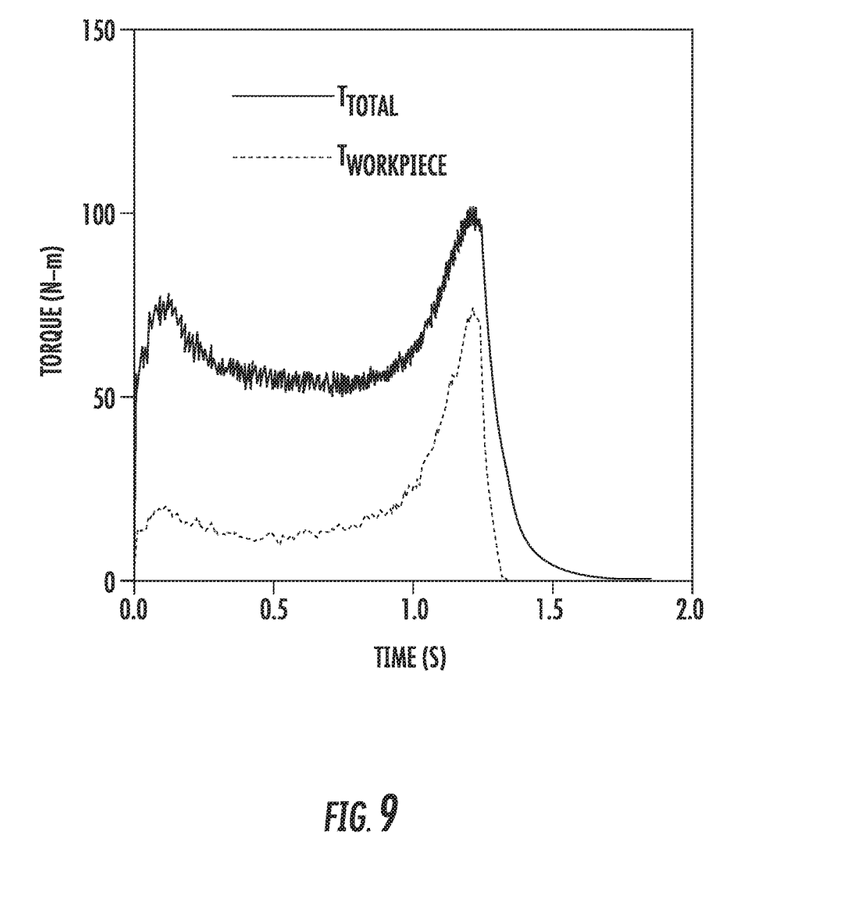
FIG. 9 is a graph illustrating examples of the measured total torque ($T_{Total}$) and the workpiece torque ($T_{Workpiece}$).

Referring now to FIG. 8, a flow diagram illustrating example operations for calculating efficiency of a rotary friction welding process is shown. During IFW, the rotational velocity of the flywheel of the IFW machine (e.g., IFW machine of FIG. 2) decreases over time. At 802, the rate of the rotational velocity decay (e.g., deceleration of the angular velocity) can be determined. For example, the rotational velocity decay can be determined in the IFW machine via sensors such as shaft encoders, reed switches (e.g., magnets on the spindle and/or stationary part), reflectors/cameras, etc. Measuring the rotational velocity and other process parameters (e.g., axial force and burnoff length) in rotary friction welding machines are well known in the art and are therefore not described in further detail herein. At 804, the rate of velocity decay allows the determination of a total torque using the rotational form of the Newton's $2^{nd}$ Law of motion, as given by Equation (1).

$$T_{Total} = I\frac{d\omega}{dt} \quad (1)$$

where $T_{Total}$ is the total torque (N·m), I is the flywheel moment of inertia (kg·m²), dω is the change in angular velocity (rad/s), and dt is the time increment size (s).

$$\frac{d\omega}{dt}$$

is the deceleration of the rotational velocity. It is noted that both ω and $$\frac{d\omega}{dt}$$

are functions of time; the calculated torque used in later steps is also a function of time. An example of the total torque ($T_{Total}$) is shown in FIG. 9. In other words, a total torque required to cause a decrease in the rotational velocity of the welding machine can be calculated at 804.

Then, at 806, an energy associated with the total torque (e.g., $E\,T_{Total}$) can be calculated. For example, the kinetic energy of the flywheel (E) at a given time is given as:

$$E = \frac{1}{2}I\omega^2.$$

Hence, the rate of flywheel energy decrease is $$\frac{dE}{dt} = \frac{1}{2}I\omega \times 2\frac{d\omega}{dt} = I\omega\frac{d\omega}{dt}.$$

Using Equation (1), one can obtain $$\frac{dE}{dt} = T\omega, \text{ where } \frac{dE}{dt}$$

corresponds to the instantaneous power (or the instantanous energy per unit time) consumed. Rearranging this equation, one can obtain: dE=Tωdt. The instantaneous energy associated with the total torque can be defined by $dE_{Total}=T_{Total}d\omega$. Additionally, the total energy loss of the flywheel ($E_{Total}$) at time t can be calculated by integrating the above equation, as shown in Equation (2).

$$E_{Total}=\int_0^t T_{Total}(t)\omega(t)dt \quad (2)$$

In other words, the cumulative energy associated with the total torque can be calculated using Eqn. (2). At 808, a workpiece torque experienced by a sample (e.g., rotating sample 202 or non-rotating sample 203 of FIG. 2) can be measured, for example using a torque load cell (e.g., load cell 204 of FIG. 2). This can occur in-situ during the welding process. Then, at 810, an energy associated with the workpiece torque (e.g., $E_{Workpiece}$) can be calculated. For example, the rotating part being joined is attached to the flywheel so its rotational velocity is exactly the same as that of the flywheel. For simplicity, a quasi-static equilibrium of torque is considered to be established along the axial direction of the parts. Although the cycle time for IFW may appear short (e.g., of the order of 1 s), this simplification is valid considering that the speed of elastic stress wave in metals is of the order of 1,000 m/s. Hence, the torque acting on the rotating part is equal to the reacting torque acting on the stationary part. The energy change to the rotating part ($dE_{Workpiece}$) is thus given as:

$$dE_{Workpiece}=T_{Workpiece}\omega dt \quad (3)$$

where $T_{Workpiece}$ is the workpiece torque acting on the rotating or non-rotating part. An example of the measured workpiece torque ($T_{Workpiece}$) is shown in FIG. 9. It is noted that the energy change to the non-rotating part is essentially zero since it is stationary (zero rotational velocity). In other words, the net amount of energy for frictional heating and deforming the parts is equal to that calculated from Eqn. (3), so the instantaneous power (or the instantaneous energy per unit time) associated with the workpiece torque (e.g., $dE_{Workpiece}$) is calculated as $$\frac{dE_{Workpiece}}{dt} = T_{Workpiece}\,\omega.$$

To obtain the cumulative energy associated with the workpiece torque (e.g., $E_{Workpiece}$), Eqn. (3) can be integrated over time, as shown by Eqn. (4):

$$E_{Workpiece}=\int_0^t T_{Workpiece}(t)\omega(t)dt \quad (4)$$

At 812, two efficiencies can be defined based on the aforementioned energy terms:

$$\eta_t = \frac{dE_{Workpiece}}{dE_{Total}} = \frac{T_{Workpiece}}{T_{Total}} \quad (5a)$$

$$\eta = \frac{E_{Workpiece}}{E_{Total}} = \frac{\int_0^t T_{Workpiece}\,\omega dt}{\int_0^t T_{Total}\,\omega dt} \quad (5b)$$

where $\eta_t$ is the instantaneous efficiency, and η is the cumulative efficiency at time t. It is noted that there is also work done by the applied axial force over the upset distance. However, this energy is much lower than the flywheel kinetic energy in the case of inertia friction welding or the energy used to rotate the welding machine shaft with welded samples in the case of direct drive friction welding and can be ignored from the efficiency calculations.

After calculating the efficiency of the rotary friction welding process and determining its dependence on the welding process parameters, such as flywheel moment of inertia and initial kinetic energy and/or axial compression force, the efficiency can be used to control the rotary friction welding process. The calculated efficiency can also be used to monitor the "health" of the IFW/rotary weld equipment (specifically drive train, bearings, etc.) and/or also to monitor the process as the dynamics of the weld equipment changes during weld campaigns. For example, if the hydraulic fluid temperature changes, it would impact the bearing performance and efficiency of the process. This effect can be monitored by tracking the efficiency of the welding process. The calculated efficiency can also be used for the selection of welding parameters to produce sound joints at the minimum total energy used for welding. For example, the efficiency of the rotary friction welding process can be used in a computational thermal or thermal-stress model used to determine a parameter for the rotary friction welding process. Optionally, the parameter can include at least one of axial load, initial rotational velocity or kinetic energy for the welding machine flywheel, sample surface roughness, sample diameter, pre-heating temperature, welding time, burnoff length, or interface temperature. The calculated efficiency and/or welding parameters also enable the efficient and effective scale-up of weld process parameters from lab-scale to component-scale, or from one machine to another.

Widespread application of the methods and systems described herein for determining efficiency is highly feasible since it requires no machine modifications, and IFW is already a common welding process. Adoption relies on obtaining a torque load cell and modified sample machining for use in the load cell or placing the strain gages directly on the samples for measuring the workpiece torque, as well as a data acquisition system and processing software to register and process signals and calculate the efficiency. A similar apparatus can easily be scaled up or down for use in any sized inertia friction welding machine or other rotary friction welding machines. Additionally, other friction torque measurement devices or machine modifications may be used. The methods and systems described herein result in a low-cost, high-benefit scenario for potential adopters.

The methods and systems described herein can be further utilized to create a closed-loop feedback control system to ensure that high-quality welds are consistently made. For example, the torque can be monitored and the instantaneous, as well as cumulative, energy input to the joint can be calculated in real time during welding. The machine parameters can be then adjusted accordingly to regulate the energy input so that a high-quality weld can be obtained. Such system can contain the necessary torque measurement device and software for efficiency calculation, and could be implemented via a device installed into an existing machine or offered as a feature by IFW machine manufacturers.

Energy-efficient manufacturing is of high interest due to the cost- and energy-savings available for large-scale turbine engine manufacturing companies. In 2006, the need for 90,000 engines worth $550 billion was projected. See R. Reed, The Superalloys Fundamentals and Applications, Cambridge University Press, 2006. Additionally, evaluation of some turbine engine components may cost up to $500,000/test. See D. J. Tung, W. Zhang, D. Mahaffey, O. Senkov. "Modeling Heat Generation in Inertia Friction Welding," Materials Science and Technology (MS&T) Conference 2014. Considering some parts may cost hundreds of thousands of dollars, the total cost per trial-and-error experiment may reach $1 million. Eliminating even a few of these tests would have significant cost reductions for manufacturers. The methods and systems described herein can play a role in reducing the number of experimental trials by providing the much-needed machine efficiency values to guide both welding experiments and finite element models.

An additional benefit of the methods and systems described herein is that it can allow the manufacturer to reduce the energy usage during manufacturing. In other words, using the methods and systems described herein to verify that a particular set of process parameters, resulting in a weld of similar quality, requires using less energy could save the manufacturer electricity costs and minimize environmental impact. The methods and systems described herein for determining IFW machine efficiency opens the door for efficiency-based process parameter optimization. As energy consumption and emission concerns rise, efficient manufacturing becomes critical.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
   measuring, using a strain gauge, a workpiece torque experienced by a sample;
   calculating, using a computing device, an energy associated with the workpiece torque; and
   calculating, using the computing device, an efficiency of a rotary friction welding process using the energy associated with the workpiece torque.

2. The method of claim 1, further comprising:
   measuring a rotational velocity of the welding machine;
   calculating a total torque required to cause a decrease in the rotational velocity of the welding machine; and
   calculating an energy associated with the total torque, wherein the efficiency of the rotary friction welding process is calculated using the energy associated with the workpiece torque and the energy associated with the total torque.

3. The method of claim 2, wherein the energy associated with the total torque is an instantaneous energy or a cumulative energy over a period of time.

4. The method of claim 2, wherein the efficiency of the rotary friction welding process comprises a ratio between the energy associated with the workpiece torque and the energy associated with the total torque.

5. The method of claim 1, further comprising using the efficiency of the rotary friction welding process in a computational thermal or thermal-stress model used to determine a parameter for the rotary friction welding process.

6. The method of claim 5, wherein the parameter comprises at least one of axial load, moment of inertia of a flywheel for an inertia friction welding machine, initial rotational velocity or kinetic energy for the flywheel for the inertia friction welding machine, rotational speed of a direct drive welding machine, sample surface roughness, sample diameter, pre-heating temperature, welding time, burnoff length, or interface temperature.

7. The method of claim 1, wherein
   the strain gauge is attached to the sample.

8. The method of claim 1, wherein the energy associated with the workpiece torque is an instantaneous energy or a cumulative energy over a period of time.

9. The method of claim 1, further comprising obtaining a total energy supplied to the welding machine to spin the sample, wherein the efficiency of the rotary friction welding process is calculated as a ratio between the energy associated with the workpiece torque and the total energy.

10. The method of claim 1, wherein the rotary friction welding process comprises inertia friction welding, continuous drive friction welding, hybrid friction welding, or orbital friction welding.

11. The method of claim 1, further comprising using the efficiency of the rotary friction welding process to control the rotary friction welding process.

12. A system, comprising:
   a torque load cell configured to measure a workpiece torque experienced by a sample; and
   a processor and a memory operably coupled to the processor, wherein the memory has computer-executable instructions stored thereon that, when executed by the processor, cause the processor to:
receive the workpiece torque experienced by the sample;
calculate an energy associated with the workpiece torque; and
calculate an efficiency of a rotary friction welding process using the energy associated with the workpiece torque.

13. The system of claim 12, the memory having further computer-executable instructions stored thereon that, when executed by the processor, cause the processor to:
receive a rotational velocity of a welding machine;
calculate a total torque required to cause a decrease in the rotational velocity of the welding machine; and
calculate an energy associated with the total torque, wherein the efficiency of the rotary friction welding process is calculated using the energy associated with the workpiece torque and the energy associated with the total torque.

14. The system of claim 13, wherein the energy associated with the total torque is an instantaneous energy or a cumulative energy over a period of time.

15. The system of claim 13, wherein the efficiency of the rotary friction welding process comprises a ratio between the energy associated with the workpiece torque and the energy associated with the total torque.

16. The system of claim 12, wherein the torque load cell is attached to the sample.

17. The system of claim 12, wherein the sample is a rotating or non-rotating sample.

18. The system of claim 12, wherein the energy associated with the workpiece torque is an instantaneous energy or a cumulative energy over a period of time.

19. The system of claim 12, the memory having further computer-executable instructions stored thereon that, when executed by the processor, cause the processor to receive a total energy supplied to the welding machine to spin the sample, wherein the efficiency of the rotary friction welding process is calculated as a ratio between the energy associated with the workpiece torque and the total energy.

20. The system of claim 12, wherein the rotary friction welding process comprises inertia friction welding, continuous drive friction welding, hybrid friction welding, or orbital friction welding.

21. A non-transitory computer-readable recording medium having computer executable instructions stored thereon that, when executed by a processor, cause the processor to:
receive a workpiece torque experienced by a sample;
calculate an energy associated with the workpiece torque;
receive a rotational velocity of a welding machine;
calculate a total torque required to cause a decrease in the rotational velocity of the welding machine;
calculate an energy associated with the total torque; and
calculate an efficiency of a rotary friction welding process using the energy associated with the workpiece torque and the energy associated with the total torque.

* * * * *

UNITED STATES PATENT AND TRADEMARK OFFICE
CERTIFICATE OF CORRECTION

PATENT NO. : 10,799,979 B2
APPLICATION NO. : 15/824251
DATED : October 13, 2020
INVENTOR(S) : Wei Zhang et al.

It is certified that error appears in the above-identified patent and that said Letters Patent is hereby corrected as shown below:

In the Specification

Column 5, Line 5, "temperature alloys–especially i-precipitate-strengthened" should read --temperature alloys–especially $\gamma'$-precipitate-strengthened--

Column 11, Line 27, "(e.g., E $T_{Total}$) can be calculated. For example, the kinetic" should read --(e.g., $E_{Total}$) can be calculated. For example, the kinetic--

Signed and Sealed this
Nineteenth Day of January, 2021

Andrei Iancu
*Director of the United States Patent and Trademark Office*